United States Patent

Siverling et al.

Patent Number: 6,015,494
Date of Patent: Jan. 18, 2000

[54] POLYOLEFIN OIL/WATER SEPARATOR

[75] Inventors: Todd D. Siverling, Albuquerque; William Anthony Chroninger, Los Alamos; William Andrew Chroninger, Rio Rancho; Kreg T. Gauss; William S. Radzinski, both of Alamos, all of N.Mex.

[73] Assignee: The Regents of the University of California, Los Alamos, N.Mex.

[21] Appl. No.: 08/685,790

[22] Filed: Jul. 24, 1996

Related U.S. Application Data

[63] Continuation of application No. 08/219,581, Mar. 28, 1994, abandoned.

[51] Int. Cl.[7] .............................. B01D 21/00; B01D 47/14
[52] U.S. Cl. ..................... 210/299; 210/295; 210/503; 95/211; 96/154
[58] Field of Search ........................... 210/263, 265, 210/287, 242.3, 502.1, 799, 503, 242.4, 295, 299; 95/211, 116, 118; 96/153, 154; 264/143; 428/397

[56] References Cited

U.S. PATENT DOCUMENTS

| | | | |
|---|---|---|---|
| 3,066,462 | 12/1962 | Yap et al. | 96/153 |
| 3,364,656 | 1/1968 | Whiton et al. | 95/211 |
| 3,370,401 | 2/1968 | Lucas et al. | 95/211 |
| 3,754,377 | 8/1973 | Clonts | 95/211 |
| 3,944,402 | 3/1976 | Cheremisinoff | 95/211 |
| 4,022,593 | 5/1977 | Lerner | 95/211 |
| 4,212,733 | 7/1980 | Goto et al. | |
| 4,274,971 | 6/1981 | Hartinger et al. | |
| 4,332,854 | 6/1982 | Parker | |
| 4,737,394 | 4/1988 | Zafiroglu | |
| 4,960,520 | 10/1990 | Semmens | 210/640 |
| 5,093,060 | 3/1992 | Samuels et al. | 264/143 |
| 5,169,519 | 12/1992 | Elsas | |

Primary Examiner—Ana Fortuna
Attorney, Agent, or Firm—Samuel M. Freund

[57] ABSTRACT

Polyolefin oil/water separator. An oil/water mist separator for use with exhausts from air compressors, air separators, air receivers, and air dryers, as examples, is described. The separator utilizes fibrous polyolefin strips placed in a hollow receptacle therefor to separate the oil from the water in the mist, the oil being retained on the polyolefin, while the water, now having sufficient purity, may be discharged in conventional sanitary drains. The separator may also be used to separate oil from water from other sources thereof.

13 Claims, 1 Drawing Sheet

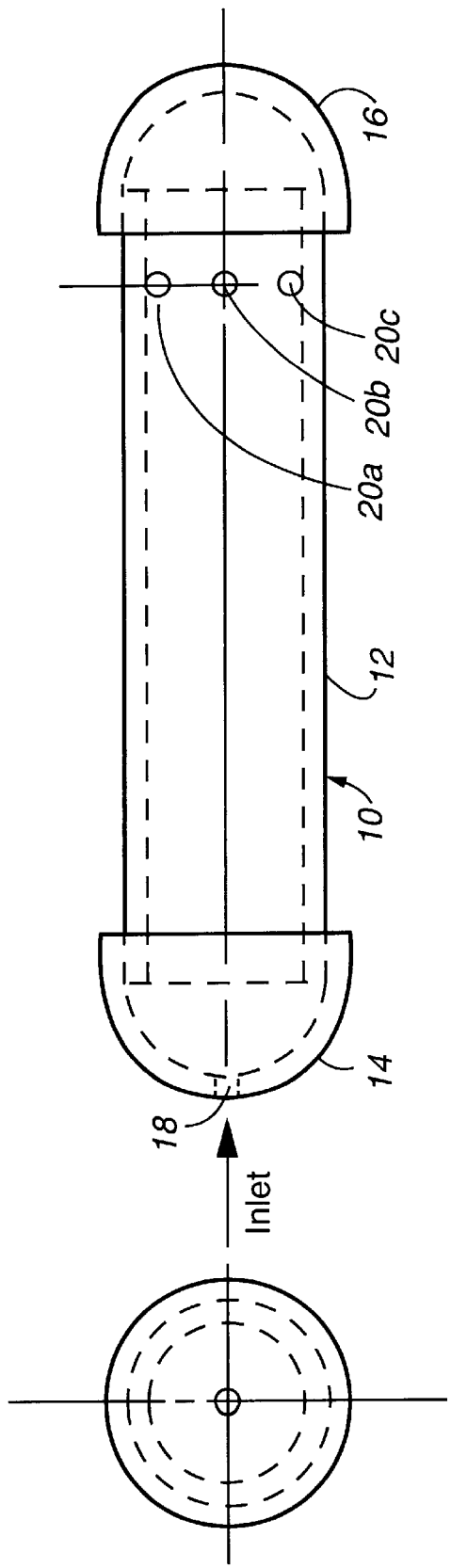

POLYOLEFIN OIL/WATER SEPARATOR

This is a continuation of copending application Ser. No. 08/219,581 filed on Mar. 28, 1994 now abandoned.

FIELD OF THE INVENTION

The present invention relates generally to separation of oil from water in oil/water mixtures entrained in compressed air systems generated by air compressors and, more particularly, to the use of shredded fibrous polypropylene sheet packed into an open tube for receiving the oil/water mixture in the form of a mist from an air compressor or from another source thereof. This invention was made with government support under Contract No. W-7405ENG-36 awarded by the U.S. Department of Energy. The government has certain rights in the invention.

BACKGROUND OF THE INVENTION

It is estimated that 25 million gallons of condensate and 21,000 gallons of acidic oil are discharged from compressed air systems each day in the United States. With the discharge of oil/water mixtures into sanitary drains no longer being possible in view of environmental considerations and paying hauling companies to remove the bulk effluent being expensive, procedures for handling oil/water mists generated by air compressors and similar equipment have become increasingly important. Commercially available oil/water separators separate the oil as a liquid by trapping the mist and permitting the oil to coalesce, thereby forming a film on the surface of the condensate which can be siphoned off, leaving partially cleaned water. This water is then further purified using activated charcoal and can then be discharged. The process leaves the oil-impregnated charcoal and liquid oil for disposal.

The affinity of polypropylene for oil is well-known. For example, in "Oil Spill Recovery System," U.S. Pat. No. 5,169,519, which issued to Norman E. Elsas on Dec. 8, 1992, the author describes an oil spill recovery system which deposits a polypropylene quilt onto an oil spill on water. After interacting with the oil film, the quilt is retrieved and the oil squeezed therefrom. Similarly, in "Polypropylene Oil Removal Structure," U.S. Pat. No. 4,332,854, which issued to James H. Parker on Jun. 1, 1982, the inventor describes a loose, fluffy polyolefin mass having many interstices formed throughout the mass for use in the removal of spilled oil from the surface of a body of water. U.S. Pat. No. 4,737,394 for "Article For Absorbing Oils," which issued to Dimitri P. Zafiroglu on Apr. 12, 1988, describes a porous outer fabric which consists of a nonwoven fibrous layer of polypropylene or polyethylene that is stitch-bonded with an elastic thread, for enclosing fibrous oil-absorbing particles. The fabric has sufficient porosity to permit oil to pass through rapidly to the absorbent material.

There are many polyolefin-based oil filters. In "Oil-Water Separation Filters," U.S. Pat. No. 4,212,733, which issued to Yuzuru Goto et al. on Jul. 15, 1980, an oil-water separation filter which is constructed from a sintered polyethylene powder bonded to a fibrous layer is described. When passed through such a filter, the water containing the oil becomes clear and has an extremely low oil content. In "Filtration Process Using Polyolefin Fibrids As Filter Aids," U.S. Pat. No. 4,274,971, which issued to Edmund Hartinger et al., on Jun. 23, 1981, the authors discuss the use of crystalline polyolefins which, after being rendered hydrophilic, are added to the suspension to be filtered, as aids in the filtration process. U.S. Pat. No. 4,960,520 for "Method Of Removing Organic Volatile And Semi-Volatile Contaminants From An Aqueous Solution," which issued to Michael J. Semmens on Oct. 2, 1990, describes the use of hollow-fiber membranes of microporous polypropylenes coated with plasma polymerized disiloxane and potted in a module for removing contaminants from aqueous solution. Contaminated water is pumped through the fibers. The contaminants diffuse across the membranes and into an awaiting oil bath for removal thereof. The result is clean water and a smaller volume of more highly contaminated oil.

Air compressors generally have storage tanks called "receivers" which collect and store the high-pressure air. As the air is compressed, moisture in the air condenses and collects in the receivers. Small quantities of oil, used to lubricate the air compressor, are also carried into the receiver, where it condenses and mixes with the water. The water and oil must be periodically drained from the receiver, a process which was in the past simply accomplished by discharging ("blow down") the receiver into a floor drain.

Accordingly, it is an object of the present invention to provide an oil/water separator having low impedance to airflow, while separating oil and water in a mist thereof entrained in the airflow.

Another object of the present invention is to provide an oil/water separator having low impedance to airflow, while removing sufficient oil from water in a mist thereof entrained in the airflow that the water may be safely discharged into sanitary drains.

Yet another object of the present invention is to provide an oil/water separator having low impedance to airflow, while removing sufficient oil from water in a mist thereof entrained in the airflow that the water may be safely discharged into sanitary drains while the oil is sequestered in the separator.

Still another object of the present invention is to provide an oil/water separator for removing oil from water from any source thereof.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of the present invention for separating oil from water in an oil/water mist thereof entrained in a compressed air system or from any source of an oil/water mixture includes in combination: a hollow separator element having an inlet port for admitting gases in which the oil/water mist is entrained and at least one exit port located away from the inlet port, and shredded fibrous polyolefin sheet packed into the hollow separator element, whereby the gas flow is not substantially impeded, and water and unabsorbed gas may exit the exit port in the separator element.

Preferably, the polyolefin includes polypropylene.

It is also preferred that the separator element be oriented either in a horizontal position or having the exit port located below the gas inlet port so that the water, 99.999% free of oil, may be readily discharged.

Benefits and advantages of the present invention include an inexpensive solution to an important environmental problem; that of oil/water mist emissions from air compressors. The disposable separator provides a reduction in the labor required for handling the trapped liquids in that the purified water may simply be admitted to ordinary sanitary drains, while the oil, since it is bound to the polyolefin, may be deposited with the separator element in municipal wastefills.

BRIEF DESCRIPTION OF THE DRAWINGS

The accompanying drawing, which is incorporated in and forms a part of the specification, illustrates one embodiment of the present invention and, together with the description, serves to explain the principles of the invention. In the drawing:

FIG. 1a is a schematic representation of the oil/water mist filter of the present invention, while FIG. 1b is a schematic representation of the top view thereof.

DETAILED DESCRIPTION OF THE INVENTION

Briefly, the present invention includes a separator for oil/water mists or oil/water mixtures arising from the use of air compressors, air separators, air receivers, and air dryers, as examples, which utilizes strips of fibrous polyolefin packed in a hollow receptacle therefor in order to separate the oil from the water in the mist or other form thereof when the oil/water mixture is passed therethrough. The oil is sequestered on the polyolefin, while the water, now having sufficient purity, may be discharged in conventional sanitary drains.

Reference will now be made in detail to the present preferred embodiment of the invention, an example of which is illustrated in the accompanying Figure. Turning now to the FIG. 1a, a schematic representation a side view of one embodiment of the present apparatus is shown. FIG. 1b is a schematic representation of the top view thereof. The separator, 10, includes polyvinyl chloride tube 12, typical dimensions being 24 in. long by 4 in. inner diameter, and polyvinyl chloride end caps 14 and 16. Clearly, any sturdy material which does not react with oil or water may be utilized. End cap 14 has an inlet port 18, which is shown as a hole therein. This port may be adapted to threaded fittings on the exhaust of air compressors and the like which emit oil mists. Exhaust holes, 20 a-c, permit untrapped gases and water to exit tube 12. Separator 10 is loosely filled with polypropylene strips shredded from fibrous polypropylene sheet. The strips are layered in order to prevent them being blown out of the exhaust holes. The amount and size of the strips are selected in order to prevent a significant back pressure from being established to the source of exhaust gases, while maintaining sufficient oil extraction. In tests, ¼"×¼"×18" polypropylene strips were packed into the separator. Analytical evaluations have shown that an incoming mist containing about 92,000 ppm of oil in the oil/water mist was purified using the present separator such that the exhaust water contained 15 ppm (99.999% of the oil has been removed), a level suitable for discharge in ordinary sanitary drains. In order for the present separator to be used effectively, it is preferred that tube 12 be oriented approximately horizontally or with the exhaust holes 20 lower than inlet port 18, in order that the purified water be permitted to drain freely from the separator. Depending on the condition of the air compressor to which the separator of the present invention is attached, the polypropylene becomes saturated with oil. Saturation was observed by permitting the exhaust water to come into contact with a white polypropylene pad; when the separator becomes saturated, emitted oil coats the pad which turns yellow as a result.

The foregoing description of the invention has been presented for purposes of illustration and description and is not intended to be exhaustive or to limit the invention to the precise form disclosed, and obviously many modifications and variations are possible in light of the above teaching. For example, it would be apparent to one having ordinary skill in the art of filtering of aerosols, after having read the subject disclosure, that polyethylene strips could be employed. Moreover, if an oil/water mixture from any source is passed through the present separator, water purification will occur. Therefore, the present apparatus may be used for cleaning oil/water mixtures found in bilges of boats, as one possibility.

The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for separating oil from water in an oil/water mist thereof entrained in a gas flow, said apparatus consisting essentially of:
  a. a hollow separator element having an inlet port for admitting gases in which an oil/water mist is entrained, and at least one exit port located away from the inlet port; and
  b. shredded fibrous polyolefin sheet packed into said hollow separator element, whereby the gas flow is not substantially impeded, water and unabsorbed gas may exit through the at least one exit port in said separator element, and oil is absorbed by said fibrous polyolefin.

2. The apparatus as described in claim 1, wherein said hollow separator element includes polyvinyl chloride piping.

3. The apparatus as described in claim 1, wherein said hollow separator element is disposed horizontally in order that the water drains through the at least one exit port in said separator element.

4. The apparatus as described in claim 1, wherein the at least one exit port in said hollow separator element is located in the vicinity of the opposite end thereof from the inlet port.

5. The apparatus as described in claim 1, wherein said hollow separator element is disposed such that the water drains from the at least one exit port.

6. The apparatus as described in claim 1, wherein the polyolefin includes polypropylene.

7. An apparatus for separating oil from water in an oil/water mist thereof entrained in the exhaust from an air compressor, consists essentially of:
  a. a hollow separator element having an inlet port for admitting the exhaust gases in which an oil/water mist is entrained, and at least one exit port located away form the inlet port; and
  b. shredded fibrous polylefin sheet packed into said hollow separator element, whereby the exhaust flows is not substantially impeded, water and air may exit through the at least one exit port in said separator element, and oil is absorbed by said fibrous poyolefin.

8. The apparatus as described in claim 7, wherein said hollow separator element includes polyvinyl chloride piping.

9. The apparatus as described in claim 7, wherein said hollow separator element is disposed horizontally in order that the water drains through the at least one exit port in said separator element.

10. The apparatus as described in claim 7, wherein the at least one exit port in said hollow separator element is located in the vicinity of the opposite end thereof from the inlet port.

11. The apparatus as described in claim 7, wherein said hollow separator element is disposed such that the water drains through the at least one exit port.

12. The apparatus as described in claim 7, wherein the polyolefin includes polypropylene.

13. An apparatus for separating oil from water in an oil/water mixture thereof, said apparatus consisting essentially of:

a. a hollow separator element having an inlet port for admitting the oil/water mixture, and at least one exit port located away from the inlet port; and b. shredded fibrous polyolefin sheet packed into said hollow separator element, whereby purified water may exit through the at least one exit port in said separator element, and oil is absorbed by said fibrous polyolefin.

* * * * *